March 10, 1925.
B. H. HUNT
1,529,068
WEEDER
Filed July 18, 1923
2 Sheets-Sheet 1
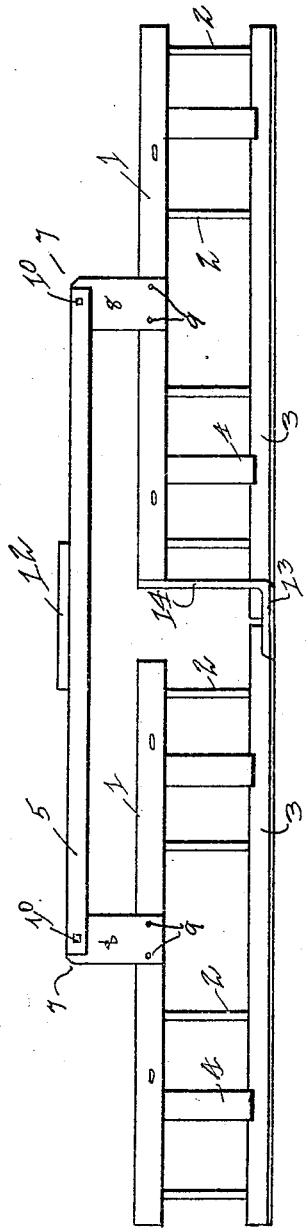
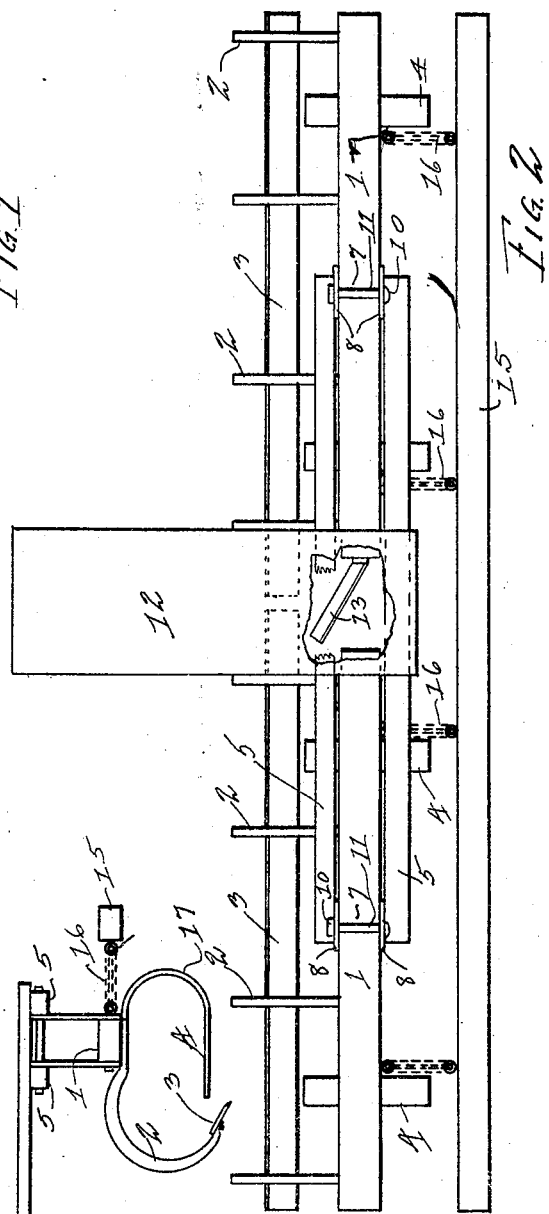
INVENTOR
BENJAMIN H. HUNT
BY
ATTORNEY

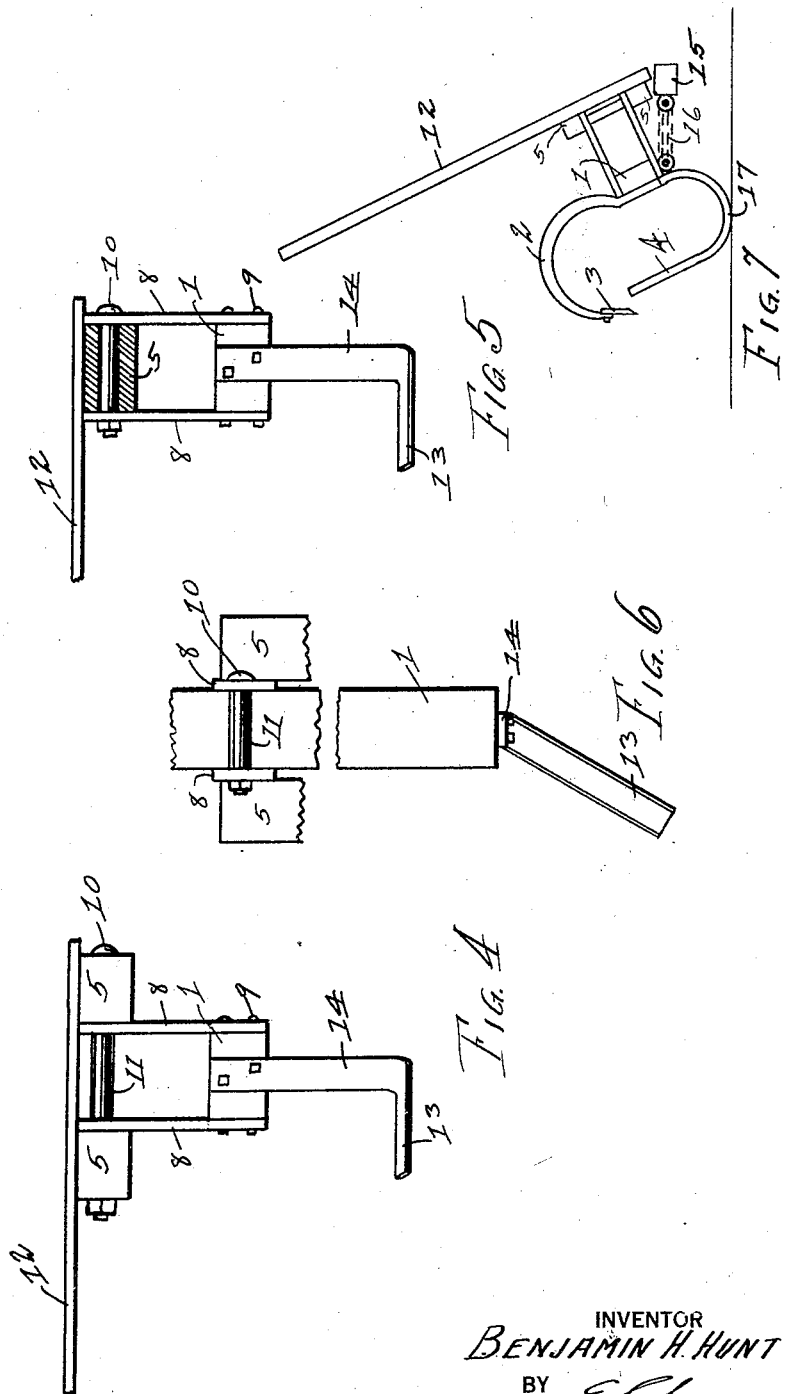

Patented Mar. 10, 1925.

1,529,068

UNITED STATES PATENT OFFICE.

BENJAMIN H. HUNT, OF WALLA WALLA, WASHINGTON.

WEEDER.

Application filed July 18, 1923. Serial No. 652,212.

*To all whom it may concern:*

Be it known that I, BENJAMIN H. HUNT, a citizen of the United States, residing at Walla Walla, in the county of Walla Walla and State of Washington, have invented certain new and useful Improvements in Weeders, of which the following is a specification.

This invention relates to weeders and has as one of its objects to provide a weeder that will accommodate itself to the contour of the ground and yet cut over a large surface.

Another object of the invention is to provide a weeder composed of two sections and that is hinged together in a manner to provide flexibility of the sections.

A further object of the invention is to provide a weeder that has an auxiliary cutting blade wherewith to complete the work between the two sections.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

Reference is now had to the accompanying drawings in which—

Fig. 1 is a front elevation of the weeder;

Fig. 2 is a plan view of the weeder;

Fig. 3 is an end elevation of the weeder;

Fig. 4 shows an end elevation of the cross bars and auxiliary blade;

Fig. 5 shows a modified form of cross bar, with auxiliary blade;

Fig. 6 is a plan view of the auxiliary blade; and

Fig. 7 is a side elevation of the weeder in the dumping position.

Having reference to the drawings like numerals refer to like parts throughout the several views and the numeral 1 refers to the frame of the weeder and comprises preferably a single timber as shown in the drawings, and to this frame is suitably attached goosenecks 2 carrying on their lower ends cutting blades 3, with shoes 4 suitably attached to the frame to maintain the blades 3 the proper depth in the ground and to support the frame, and on which the weeder may be rocked during the dumping operation, to be presently explained.

The weeder consists of two sections identical in form, and joined together end to end by cross bars 5, of which there may be two as shown in Fig. 4, or one cross bar as shown in Fig. 5.

The sections are maintained in spaced relation to each other by the cross bars and these are hinged to the frame to provide flexibility to the sections, by the hinges 7 comprising plates 8 suitably attached to the frame 1, by bolts 9 or other means. The plates are extended upward a nominal distance to provide room for the sections to swing vertically during operation and to hingedly secure the cross bars thereto which is accomplished by means of bolts 10 being passed through the bars and these plates 8. Where two bars 5 are used a spacer 11 holds the bars the proper distance apart.

Rigidly attached to the cross bars 5, in any suitable manner, is the dumping board 12 which is of sufficient size to permit the operator to ride thereon during operation, and consists of a flat board positioned so that its rearward end extends backward from the weeder while its forward end is practically flush therewith.

The weeder sections are of the old fashioned slicker type and are interchangeable, and the cross bars joining the two sections are so simple in construction that they can be made and applied to two of the slickers, without the necessity of skilled labor and with very little expense.

As the ends of the sections move in a vertical arc the frames 1 cannot be assembled with the ends too close together on account of interference, and this also applies to the blades 3 which are necessarily positioned with a gap between them for the same reason, and hence to prevent an unfinished and foul strip to remain in the field an auxiliary cutting blade 13 is provided that is securely attached to one end of one of the sections by means of the shank 14 with the blade positioned between the sections and in front of the gap between the blades 3. By this means all weeds are subject to cutting and no unclean places remain.

In operation the weeder is propelled in the usual manner, through the medium of a draw bar 15 suitably attached to the weeder by suitable chains 16.

As the work progresses and the blades 3 become clogged with weeds, the operator, who has been riding the dump board 12, jumps off the board which he then lifts until the blades are free of the ground. The accumulation of weeds now fall by gravity and the blades become clean.

The operator may now again mount the dump board and continue the weeding operation, or he may leave the weeder in this dumping position, i. e. with the dump board 12 in the air, and move the weeder from place to place. In this movement one of the cross bars 5 will obviously rest against and be sustained by the chains 16 which connects the draw bar and the weeder, and movement will be on the curved portion 17 of the shoes 4.

This may also be deemed a self dumping weeder as when the weight of the operator is removed the weeder will automatically dump as the pull of the prime mover (not shown) is above the shoes and hence will tend to turn the weeder partly over.

Having thus described my invention, I claim:

In a weeder, the combination of a pair of weeder sections positioned end to end, plates attached to each section, a cross bar hinged to the plates to maintain the sections in spaced relation to each other, a dump board attached to said cross bar, and an auxiliary blade attached to the inner end of one of said sections and positioned between said sections.

In testimony whereof I affix my signature.

BENJAMIN H. HUNT.